US007639244B2

(12) United States Patent
Ku et al.

(10) Patent No.: US 7,639,244 B2
(45) Date of Patent: Dec. 29, 2009

(54) FLAT PANEL DISPLAY USING DATA DRIVERS WITH LOW ELECTROMAGNETIC INTERFERENCE

(75) Inventors: Tzong-Yau Ku, Taipei (TW); Yung-Yu Tsai, Yongkang (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 612 days.

(21) Appl. No.: 11/445,943

(22) Filed: Jun. 2, 2006

(65) Prior Publication Data

US 2006/0290641 A1 Dec. 28, 2006

(30) Foreign Application Priority Data

Jun. 15, 2005 (TW) .............................. 94119899 A

(51) Int. Cl.
*G06F 3/038* (2006.01)

(52) U.S. Cl. ........................................ 345/204; 345/87

(58) Field of Classification Search .................... 345/98
See application file for complete search history.

(56) References Cited

U.S. PATENT DOCUMENTS

| | | | | |
|---|---|---|---|---|
| 3,172,042 | A * | 3/1965 | Dawirs | 377/110 |
| 6,379,785 | B1 * | 4/2002 | Ressler et al. | 428/304.4 |
| 2002/0027540 | A1 * | 3/2002 | Lee | 345/87 |
| 2004/0183794 | A1 * | 9/2004 | Akahori | 345/208 |
| 2005/0057580 | A1 * | 3/2005 | Yamano et al. | 345/690 |
| 2005/0219235 | A1 * | 10/2005 | Fukuo | 345/204 |
| 2006/0022603 | A1 * | 2/2006 | Shiraishi | 315/169.2 |

FOREIGN PATENT DOCUMENTS

| | | | |
|---|---|---|---|
| JP | 2006350341 | A * | 12/2006 |

* cited by examiner

*Primary Examiner*—Richard Hjerpe
*Assistant Examiner*—Dorothy Webb
(74) *Attorney, Agent, or Firm*—Fish & Richardson P.C.

(57) ABSTRACT

A display includes an array of pixel circuits and data drivers to drive the pixel circuits. The data drivers include a first data driver to receive pixel data according to a first clock frequency and to forward some of the pixel data to a second data driver according to a second clock frequency, the second clock frequency being different from the first clock frequency.

25 Claims, 17 Drawing Sheets

FLAT PANEL DISPLAY USING DATA DRIVERS WITH LOW ELECTROMAGNETIC INTERFERENCE

CROSS-REFERENCE TO RELATED APPLICATIONS

This application claims priority to Taiwan application Serial No. 94119899, filed Jun. 15, 2005, the contents of which are incorporated by reference.

BACKGROUND OF THE INVENTION

The description relates to flat panel displays.

FIG. 1 shows an example of a flat panel display 100 having a display panel 110 and a printed circuit board 120. The display panel 110 has an active display area 124 having an array of pixel circuits for showing pixels of images. Each pixel may include, e.g., a red sub-pixel, a green sub-pixel, and a blue sub-pixel. Each pixel circuit corresponds to one of the sub-pixels. The pixel circuits are driven by data drivers 112, each data driver 112 driving corresponding pixel circuits. The pixel circuits are fabricated on a glass substrate 126, and the data drivers 112 are mounted outside of the active display area 124 near the edges of the glass substrate 126. The printed circuit board 120 includes a timing controller 122 that provides pixel data, control signals, and clock signals to the data drivers 112.

The printed circuit board 120 is positioned at the back of the glass substrate 126 to reduce the width of the bezel of the display 100. The timing controller 122 communicates with the data drivers 112 through flexible printed circuits 130 that bend around the edges of the glass substrate.

SUMMARY

In one aspect, in general, a display includes an array of pixel circuits and data drivers to drive the pixel circuits. The data drivers include a first data driver to receive pixel data according to a first clock frequency and to forward some of the pixel data to a second data driver according to a second clock frequency, the second clock frequency being different from the first clock frequency.

Implementations of the display may include one or more of the following features. The first data driver sends different portions of the pixel data to the second data driver and a third data driver alternately during alternate clock cycles. The second data driver uses the received pixel data to drive corresponding pixel circuits. The third data driver uses the received pixel data to drive corresponding pixel circuits. The second clock frequency is lower than the first clock frequency. The display includes transmission lines disposed on a glass substrate to transmit pixel data from the first data driver to the second data driver. The first data driver includes a transistor-transistor-logic (TTL) interface to send the pixel data to the second data driver. The first data driver includes a differential signaling interface to send the pixel data to the second data driver. The second data driver includes a first transistor-transistor-logic (TTL) interface and a second TTL interface, the first TTL interface to receive portions of the pixel data from the first data driver, the second TTL interface to forward portions of the pixel data to a third data driver. The display includes a timing controller to output a first clock signal having pulses, a second clock signal having pulses that correspond to odd number pulses of the first clock signal, and a third clock signal having pulses that correspond to even number pulses of the first clock signal. The first data driver sends some of the pixel data to the second data driver according to the second clock signal, and sends some of the pixel data to the third data driver according to the third clock signal.

In another aspect, in general, a display includes an array of pixel circuits and data drivers to drive the pixel circuits. The data drivers include a first data driver to receive all of the pixel data from a timing controller, the pixel data being used by the first data driver and the other data drivers to drive corresponding pixel circuits.

Implementations of the display may include one or more of the following features. The first data driver includes a transistor-transistor-logic (TTL) interface to send the pixel data to another data driver. The first data driver includes a differential signaling interface to send the pixel data to another data driver.

In another aspect, in general, a display includes an array of pixel circuits, a first data driver, and a second data driver. The first data driver receives pixel data from a timing controller and use the pixel data to drive a first portion of the pixel circuits. The first data driver also receives additional pixel data from the timing controller, the additional pixel data not used by the first data driver in driving pixel circuits. The second data driver receives the additional pixel data from the first data driver and uses the additional pixel data to drive a second portion of the pixel circuits.

Implementations of the display may include one or more of the following features. The first data driver sends the additional pixel data to the second data driver through signal lines attached to a glass substrate of the display. The first data driver receives the additional pixel data from the timing controller according to a first clock frequency, and the first data driver sends the additional pixel data to the second data driver according to a second clock frequency that is different from the first clock frequency. The first data driver receives the pixel data for use in driving the first portion of the pixel circuits from the timing controller through a first number of signal lines, and the first data driver receives the additional pixel data intended for the second data driver from the timing controller through a second number of signal lines, the first number being different from the second number. The first data driver includes a transistor-transistor-logic (TTL) interface to send the additional pixel data to the second data driver. The first data driver includes a differential signaling interface to send the additional pixel data to the second data driver.

In another aspect, in general, a display includes an array of pixel circuits and data drivers to drive the pixel circuits. The data drivers include a first data driver to receive pixel data through a first number of signal lines and to forward some of the pixel data to a second data driver through a second number of signal lines, the second number being different from the first number, the second data driver using received pixel data to drive corresponding pixel circuits.

Implementations of the display may include one or more of the following features. The first data driver sends different portions of the pixel data to the second data driver and a third data driver simultaneously. The second number is less than the first number. The second number of signal lines are disposed on a glass substrate. The first data driver includes a transistor-transistor-logic (TTL) interface to send the pixel data to the second data driver, and the second data driver includes a TTL interface to receive the pixel data.

In another aspect, in general, a display includes a substrate, an array of pixel circuits disposed on the substrate, and a timing controller to output pixel data, a first clock signal, a second clock signal, and a third clock signal, each of the second and third clock signals having a frequency that is equal to one-half of the frequency of the first clock signal. The display includes a first data driver to drive corresponding pixel circuits, a second data driver to drive corresponding pixel circuits, and a third data driver to drive corresponding pixel circuits. During a first time period, the first data driver receives pixel data from the timing controller according to the first clock signal and stores the pixel data in a buffer. During a second time period, the first data driver receives pixel data from the timing controller according to the first clock signal, sends some of the pixel data to the second data driver according to the second clock signal, and sends some of the pixel data to the third data driver according to the third clock signal, each of the second and third data drivers storing the received pixel data in a buffer.

Implementations of the display may include one or more of the following features. The display includes a fourth data driver and a fifth data driver, in which during a third time period, the second data driver and the third data driver receive pixel data from the first data driver and forward the received pixel data to fourth and fifth data drivers, respectively, each of the fourth and fifth data drivers storing the received pixel data in a buffer. During a fifth time period, the first, second, third, fourth, and fifth data drivers drive corresponding pixel circuits based on pixel data stored in respective buffers.

In another aspect, in general, a method of operating a display includes transmitting pixel data from a timing controller to a first data driver at a first clock frequency, transmitting the pixel data from the first data driver to a second data driver at a second clock frequency, the second clock frequency being different from the first clock frequency; and driving pixel circuits using the second data driver based on the pixel data received at the second data driver.

In another aspect, in general, a method of operating a display includes transmitting pixel data from a timing controller to a first data driver through a first number of signal lines, transmitting the pixel data from the first data driver to a second data driver through a second number of signal lines, the first number being different from the second number; and driving pixel circuits using the second data driver based on the pixel data received at the second data driver.

In another aspect, in general, a method of operating a display includes an array of pixel circuits, the method includes transmitting first pixel data from a timing controller to a first data driver, transmitting second pixel data from the timing controller to the first data driver, transmitting the second pixel data from the first data driver to a second data driver, driving, by using the first data driver, a first portion of the pixel circuits based on the first pixel data, and driving, by using the second data driver, a second portion of the pixel circuits based on the second pixel data.

Implementations of the display may include one or more of the following features. Transmitting the second pixel data from the first data driver to the second data driver includes transmitting the second pixel data from the first data driver to the second data driver through signal lines attached to a glass substrate. The first pixel data has information about chroma values for a first portion of a row of pixel circuits, and the second pixel data has information about chroma values for a second portion of the row of pixel circuits.

In another aspect, in general, a method includes transmitting a series of pixel data from a timing controller of a display to data drivers of the display by sending the series of pixel data from the timing controller to less than all of the data drivers, and transmitting a portion of the series of pixel data from the less than all data drivers to other data drivers, and using the data drivers to drive pixel circuits of the display based on the series of pixel data.

Implementations of the display may include one or more of the following features. The series of pixel data having information about chroma values for a row of pixel circuits.

Other advantages and features will become apparent from the following description, and from the claims.

DESCRIPTION

This description describes examples of flat panel displays (e.g., liquid crystal displays) that transmit pixel data from a timing controller to a designated data driver, then transmit the pixel data from the designated data driver to other data drivers.

Figure 1:
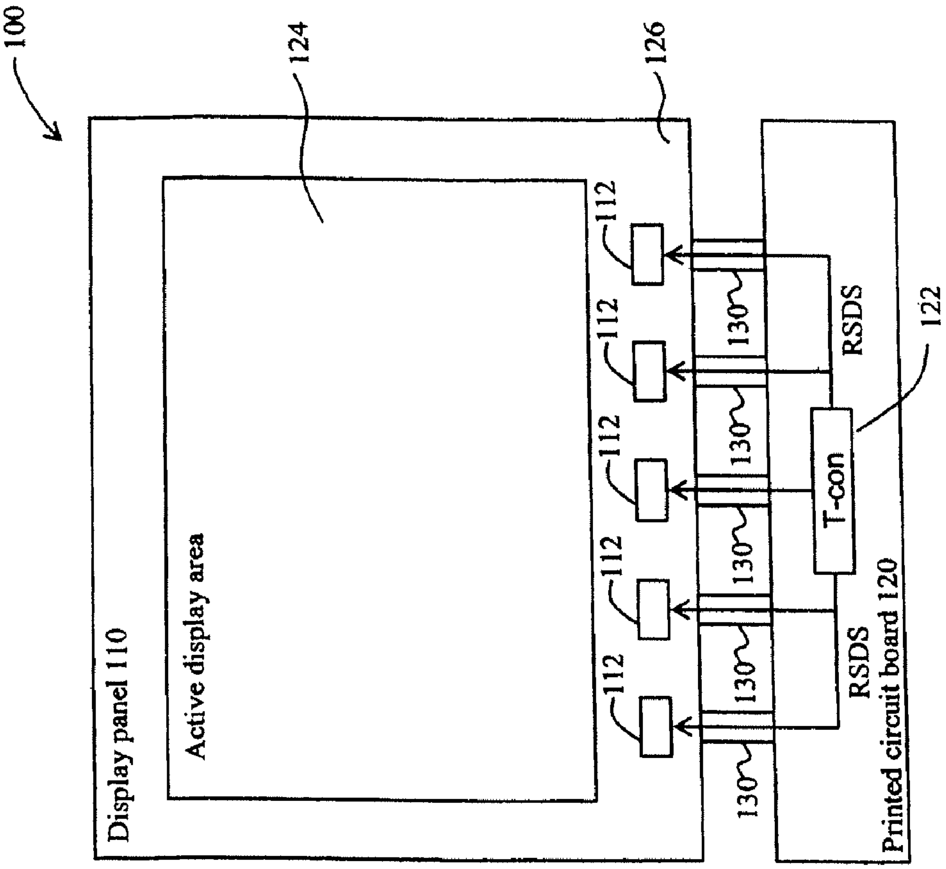
FIG. 1 PRIOR ART
FIG. 1 is a schematic diagram of a flat panel display.
Figure 2:
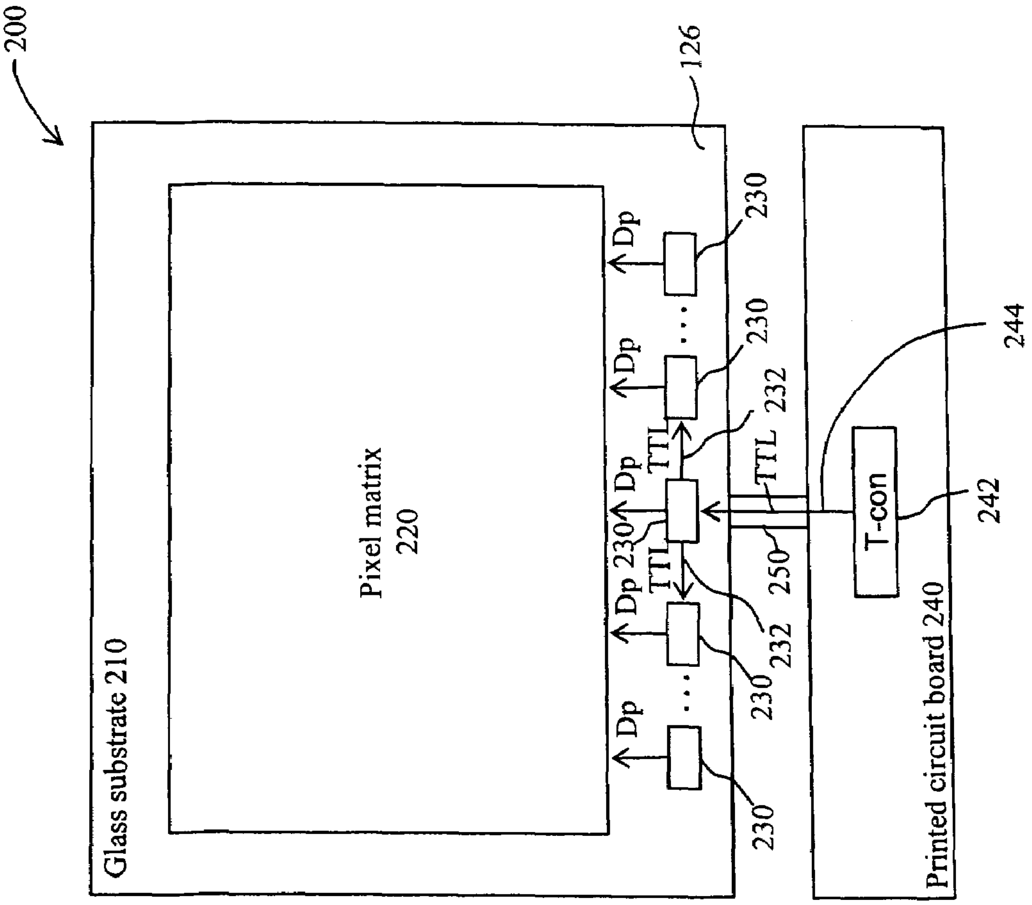
FIG. 2 is a schematic diagram of a flat panel display.

In FIG. 2, a flat panel display 200 (e.g., a liquid crystal display) includes a glass substrate 210, a pixel matrix 220, data drivers 230, and a printed circuit board 240. The pixel matrix 220 includes an array of pixel circuits that are disposed on the glass substrate 210 for displaying images. The data drivers 230 are attached to the glass substrate 210 through gold contact bumps (described later). Transmission lines 232 between the data drivers 230 are disposed directly on the glass substrate 210 (referred to as a wire-on-array, WOA, transmission structure). The data drivers 230 output pixel data Dp to the pixel matrix 220 for driving the pixel circuits.

The printed circuit board 240 is positioned at the back of the glass substrate 210. The board 240 includes a timing controller 242 that transmits control signals, clock signals, and pixel data to the data drivers 230 through signal lines 244 on a flexible printed circuit 250. The flexible printed circuit 250 bends around the edges of the glass substrate 210, and connects signal lines on the glass substrate 210 and signal lines on the printed circuit board 240.

Figure 3:
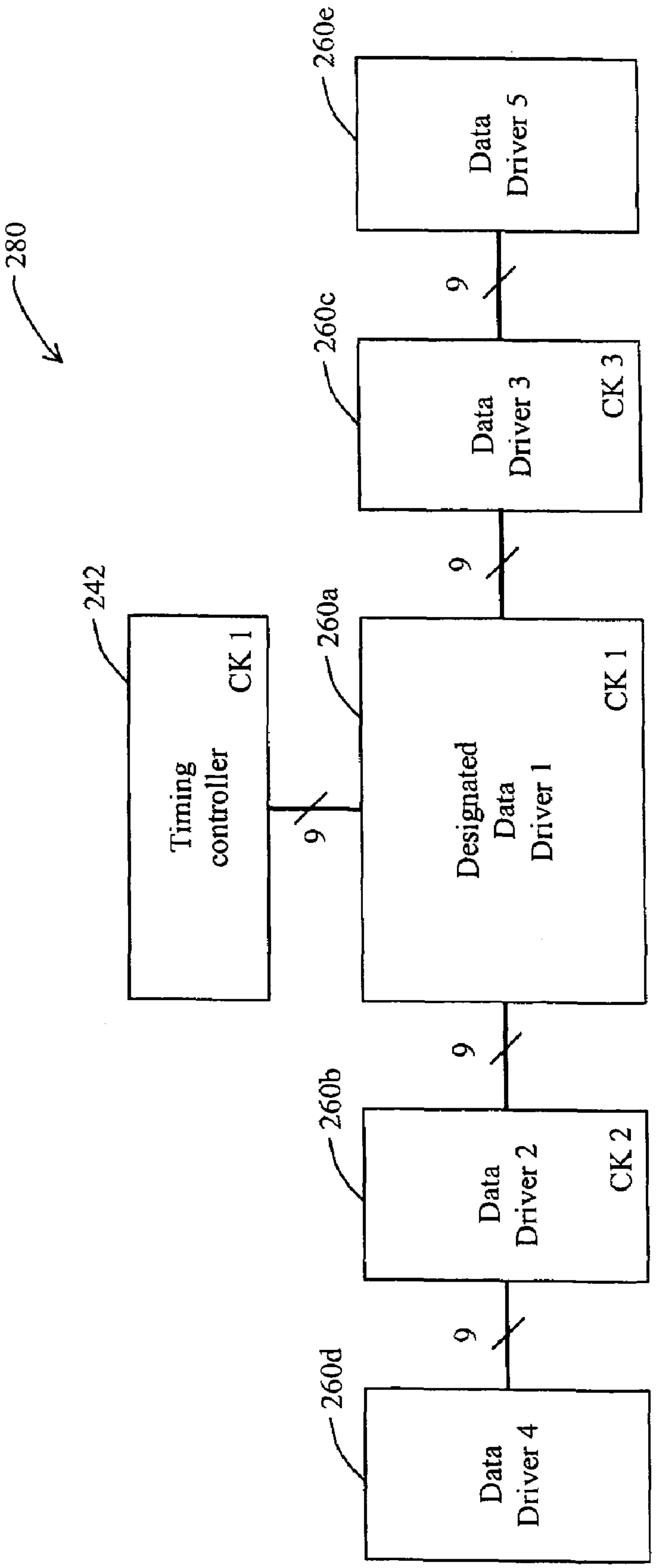
FIG. 3 is a block diagram of a timing controller and data drivers.

Referring to FIG. 3, an example of a display 280 includes a timing controller 242 and five data drivers 260*a* to 260*e*. The timing controller 242 sends all of the pixel data to a designated data driver, which is the first data driver 260*a*. The first data driver 260*a* keeps a portion of the pixel data that are intended for the first data driver 260*a*, and forwards the other pixel data to the other data drivers 260*b* to 260*e*. The second data driver 260*b* keeps a portion of the pixel data intended for the second data driver 260*b* and forwards the other pixel data to the fourth data driver 260*d*. The third data driver 260*c* keeps a portion of the pixel data intended for the third data driver 260*c* and forwards the other pixel data to the fifth data driver 260*d*. When all of the data drivers 260*a* to 260*e* have received respective pixel data, the data drivers 260*a* to 260*e* drive corresponding pixel circuits at the same time. In some examples, the data drivers 260*a* to 260*e* drive an entire row of pixels simultaneously. The above process is repeated for driving other rows of pixels.

Not shown in FIG. 3 are signal lines for transmitting clock signals. In this example, the timing controller 242 generates one clock signal, represented by clk1. The designated data driver (i.e., the first data driver 260*a*) receives pixel data D1 from the timing controller 242 according to the clock signal clk1 (meaning that the transmission of the pixel data to the first data driver 260 is synchronized using the first clock signal clk1). The pixel data D1 are intended for the first data driver 260*a*.

The first data driver 260*a* includes a clock divider (not shown) that divides the clock signal clk1 to generate a second clock signal clk2 and a third clock signal clk3 the second and third clock signals clk2 and clk3 each has a frequency that is one-half the frequency of the first clock signal clk1. The first data driver 260*a* receives pixel data D2 and D3 intended for the data drivers 260*b* and 260*c*, respectively, according to the first clock signal clk1, and transmits the pixel data D2 and D3 to the data drivers 260*b* and 260*c* according to the second and third clock signals clk2 and clk3, respectively.

In this example, it is assumed that the pixel data includes 6 bits for each of the red, green, and blue colors of a pixel. Thus, the total number of bits for each pixel is 18 bits. Nine signal lines are used to transmit the pixel data (three signal lines for sending each of red, green, and blue pixel data). The 18 bits of pixel data are sent from the timing controller 242 to the designated data driver (260*a*) in two clock cycles (9 bits per clock cycle).

Each of the data drivers 260*a* to 260*e* has a predetermined number of channels, each channel driving one pixel circuit (each pixel circuit corresponds to one sub-pixel). In this example, each of the data drivers 260*a* to 260*e* can drive 384 channels. Because each pixel data has 6 bits, 384*6/9=256 clock cycles are used to complete transmission of the pixel data needed by the data driver to drive 384 pixel circuits.

Figure 4:
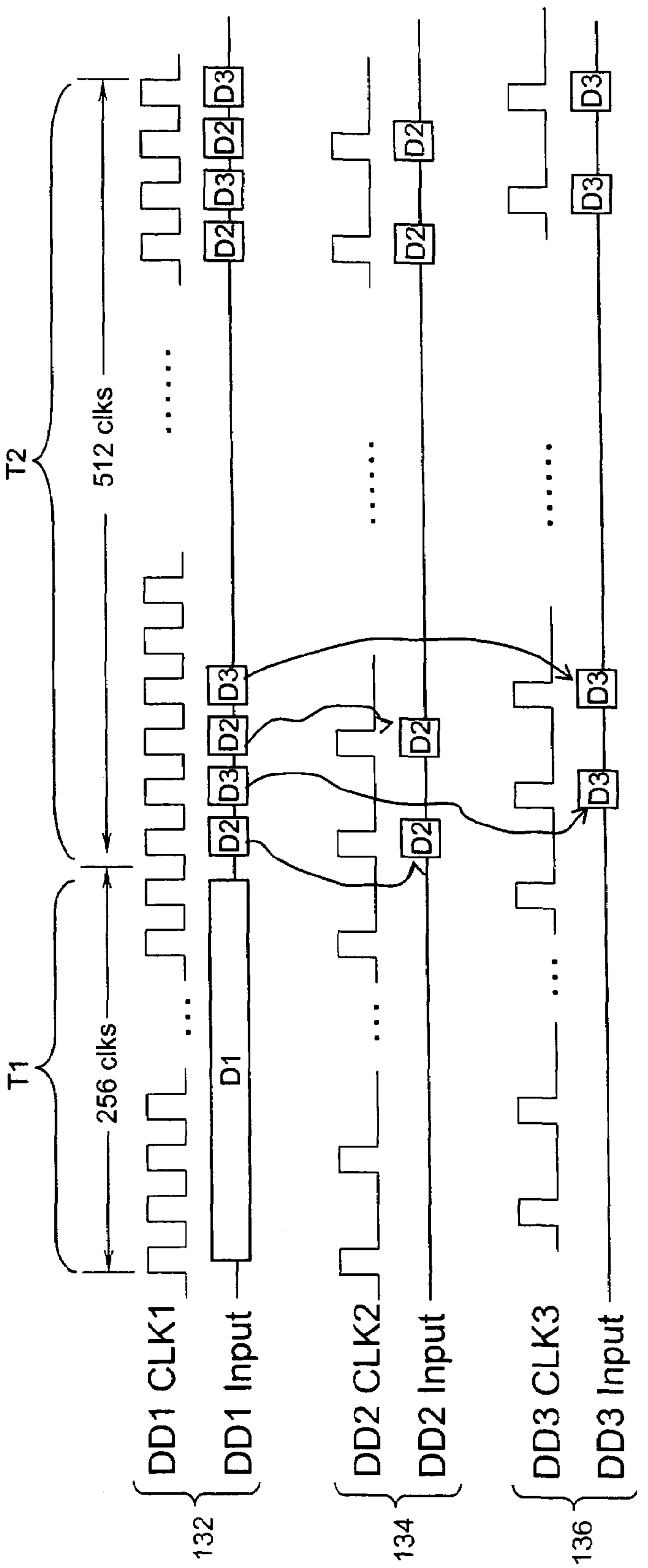
FIG. 4 are timing diagrams.

In FIG. 4, the timing diagrams show how pixel data are transmitted to the data drivers 260*a*, 260*b*, and 260*c*. A timing diagram 132 shows that, during T1 (the first 256 clock cycles), pixel data D1 intended for the first data driver 260*a* are sent to the data driver 260*a* according to the clock signal clk1. During T2 (the next 512 clock cycles), pixel data D2 and D3 intended for the data drivers 260*b* and 260*c* are sent to the first data driver 260*a* according to the clock signal clk1. Also during T2, the first data driver 260*a* sends the pixel data D2 to the second data driver 260*b* according to the second clock signal clk2, and sends the pixel data D3 to the third data driver 260*c* according to the third clock signal clk3.

There may be a delay (not shown in the figure) between the time that the first data driver 260*a* receives a pixel data D2 (or D3) intended for the second data driver 260*b* (or the third data driver 260*c*), and the time that the first data driver 260*a* outputs the pixel data D2 (or D3) to the second data driver 260*b* (or third data driver 260*c*). The time delay can be one clock cycle.

During the next 512 clock cycles (not shown in the figure), pixel data D4 and D5 intended for the data drivers 260*d* and 260*e* are sent to the first data driver 260*a* according to the first clock signal clk1. The first data driver 260*a* sends the pixel data D4 to the second data driver 260*b* according to the second clock signal clk2, and sends the pixel data D5 to the third data driver 260*c* according to the third clock signal clk3. The second data driver 260*b* sends the pixel data D4 to the fourth data driver 260*d* according to the second clock signal clk2. The third data driver 260*c* sends the pixel data D5 to the fifth data driver 260*e* according to the third clock signal clk3.

There may be a delay between the time that the second data driver 260*b* (or third data driver 260*c*) receives a pixel data D4 (or D5) intended for the fourth data driver 260*d* (or the fifth data driver 260*e*), and the time that the second data driver 260*b* (or third data driver 260*c*) outputs the pixel data D4 (or D5) to the fourth data driver 260*d* (or fifth data driver 260*e*). The time delay from one data driver to the next can be one clock cycle.

The second and third clock signals clk2 and clk3 are designed to coincide with alternate pulses of the first clock signal clk1. Thus, the first data driver 260*a* sends pixel data to the second data driver 260*b* and the third data driver 260*c* alternately. The second and third clock signals clk2 and clk3 each has a frequency that is half the clock frequency of the first clock signal clk1. Therefore, transmission of pixel data between the data drivers is performed at a frequency that is half the frequency of data transmission from the timing controller 242 to the designated data driver 260*a*.

An advantage of using a reduced clock rate for transmission of data from one data driver to another is that electromagnetic interference caused by the high frequency signals of the display can be reduced.

Figure 5:
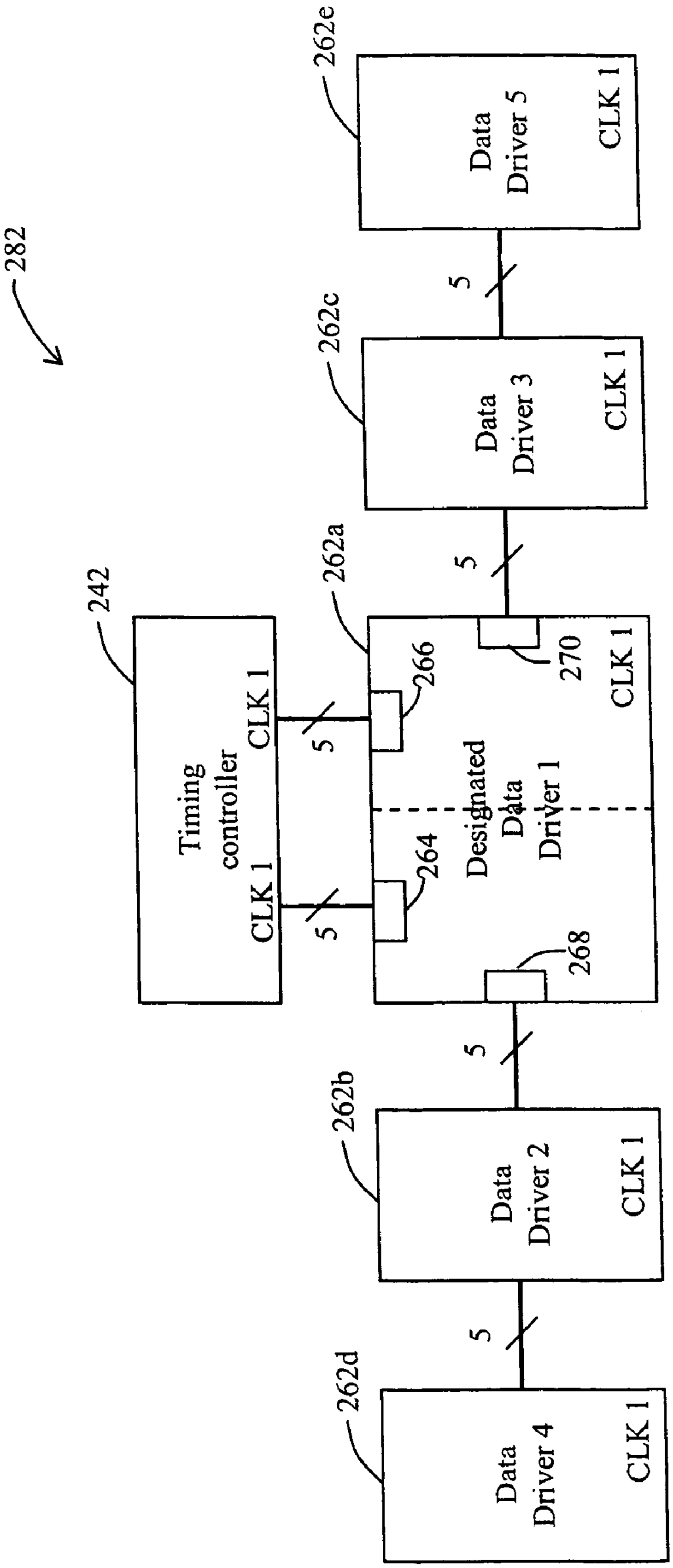
FIG. 5 is a block diagram of a timing controller and data drivers.

Referring to FIG. 5, an example of a display 282 includes a timing controller 242 and five data drivers 262*a* to 262*e*. Similarly to the display 280 (FIG. 3), the timing controller 242 of the display 282 sends all of the pixel data to a designated data driver, which is the first data driver 262*a*. The first data driver 262*a* stores a portion of the pixel data D1 intended for the first data driver 262*a*, and forwards the other pixel data (D2 to D5) to the other data drivers 262*b* to 262*e*. Different from the display 280 of FIG. 3, the display 282 use 10 signal lines to transmit pixel data from the timing controller 242 to the first data driver 262*a*, and use 5 signal lines to transmit data from one data driver (e.g., 262*a*) to another data driver (e.g., 262*b* or 262*c*).

The first data driver 262*a* has a left input 264 and a right input 266. The timing controller 242 sends 5 bits of data to the left input 264 and 5 bits of data to the right input 266 per clock cycle.

Not shown in FIG. 5 are clock signal lines for transmitting clock signals. In this example, the timing controller 242 generates one clock signal clk1. The first data driver 262*a* receives from the timing controller 242 the pixel data according to the first clock signal clk1. The first data driver 262*a* also transmits the pixel data to the data drivers 262*b* and 262*c* according to the clock signal clk1.

In this example, it is assumed that each of the data drivers 262*a* to 262*e* of the display 282 can drive 384 channels.

Figure 6:
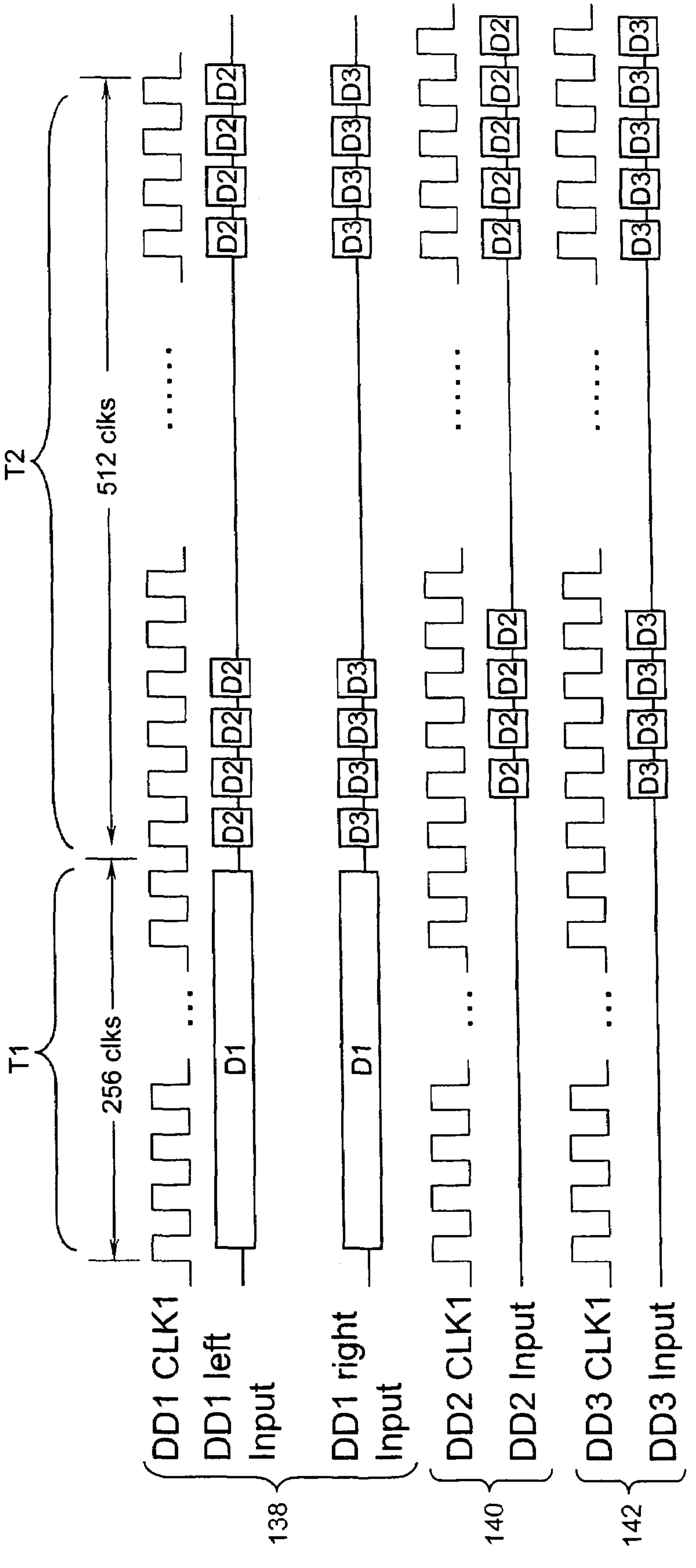
FIG. 6 are timing diagrams.

FIG. 6 are timing diagrams showing how pixel data are transmitted to the data drivers 262*a*, 262*b*, and 262*c*. A timing diagram 138 shows that, during T1 (the first 256 clock cycles), pixel data D1 intended for the first data driver 262*a* are sent to the data driver 262*a* according to the clock signal clk1. Because there are 384*6 bits of pixel data transmitted through 10 signal lines, only 231 clock cycles are actually used to transmit the 384*6 bits of pixel data to the first data driver 260*a*.

During T2 (the next 512 clock cycles), pixel data D2 and D3 intended for the data drivers 262*b* and 262*c* are sent to the data driver 262*a* according to the clock signal clk1. The first data driver 262*a* receives the pixel data D2 at the left input 264, and outputs the pixel data D2 through a left output 268 to the second data driver 262*b*, both according to the clock signal clk1. The first data driver 262*a* receives the pixel data D3 at the right input 266, and outputs the pixel data D3 through a right output 270 to the third data driver 260*c*, both according to the clock signal clk1. Because five signal lines are used to transmit the pixel data D2 and D3, only 461 clock cycles are used to transmit the pixel data D2 and D3 from the first data driver 262*a* to the second and third data drivers 262*b* and 262*c*.

There is a delay of one clock cycle between the time that the first data driver 262*a* receives a pixel data D2 (or D3), and the time that the first data driver 262*a* outputs the pixel data D2 (or D3) to the second data driver 262*b* (or third data driver 262*c*).

During the next 512 clock cycles (not shown in the figure), pixel data D4 and D5 intended for the data drivers 262*d* and 262*e* are sent to the first data driver 262*a* through the left and right inputs 264 and 266, respectively, according to the clock signal clk1. The first data driver 262*a* sends the pixel data D4 through the left output 268 to the second data driver 262*b*, which forwards the pixel data D4 to the fourth data driver 262*d*, all according to the clock signal clk1. At the same time, the first data driver 262*a* sends the pixel data D5 through the right output 270 to the third data driver 262*c*, which forwards the pixel data D5 to the fifth data driver 262*e*, all according to the clock signal clk1.

The display 282 (FIG. 5) uses 5 data signal lines (as compared to the display 280, which uses 9 data signal lines between the data drivers), so a smaller area outside of the active display area on the glass substrate needs to be allocated for the data signal lines, and thus the width of the bezel of the display 282 can be reduced. Note that clock and control signal lines are not shown in FIGS. 3 and 5.

In some examples, the signals transmitted from the timing controller 242 to the data drivers are transistor-to-transistor (TTL) signals. The TTL signals can have an amplitude up to about 3.3V. A TTL signal having a voltage larger than 3.3*0.7=2.31 V is considered to be a high level signal, whereas a signal having a voltage smaller than 3.3*0.3=0.99 V is considered to be a low level signal. Thus, a low level signal can have a voltage between 0V to 0.99V, whereas a high level signal can have a voltage between 2.31V to 3.3V.

The transmission lines 232 (FIG. 2) attached directly to the glass substrate (e.g., 210) have higher impedances as compared to the signal lines in the flexible printed circuits (e.g., 250). Signals transmitted through the transmission lines 232 attenuate faster, so the signal quality may become poorer after traveling a certain length on the transmission line 232 (as compared to signals transmitted through the flexible printed circuit 250).

An advantage of using TTL signals to transmit data and control signals from one data driver to another data driver is that the TTL signals have a higher tolerance, and it is easier to determine the signal levels of TTL signals.

Figure 7:
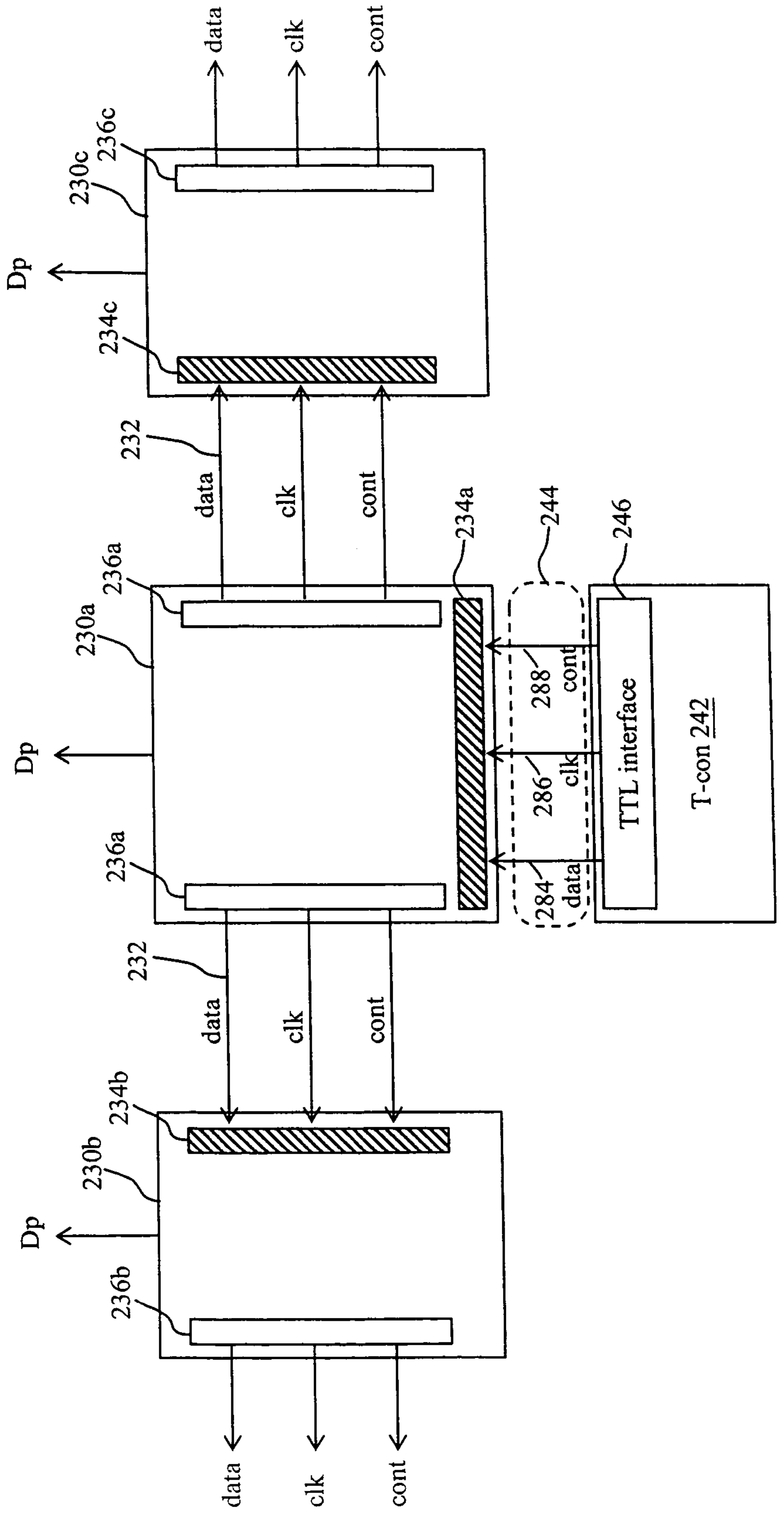
FIG. 7 shows a timing controller and data drivers.

FIG. 7 shows an example of the timing controller 242, the three data drivers 230*a* to 230*c*, and the signals that pass among them. The timing controller 242 includes a TTL interface 246 for outputting TTL signals, such as data signals 284, one or more clock signals 286, and one or more control signals 288 through the TTL transmission lines 244. The first data driver 230*a* includes a TTL receiver 234*a* and two TTL transmitters 236*a*. The second data driver 230*b* includes a TTL receiver 234*b* and a TTL transmitter 236*b*. The third data driver 230*c* includes a TTL receiver 234*c* and a TTL transmitter 236*c*. The first data driver 230*a* has two TTL transmitters 236*a* that output TTL signals (data, clock, and control signals) to TTL receivers 234*b* and 234*c* of adjacent data drivers 230*b* and 230*c*, respectively. The second data driver 230*b* has a TTL transmitter 236*b* that transmits TTL signals (data, clock, and control signals) to an adjacent data driver 230*d*. The third data driver 230*c* has a TTL transmitter 236*c* that transmits TTL signals to an adjacent data driver 230*e*, and so forth.

After the data drivers receive their respective pixel data Dp, the data drivers output the pixel data Dp to drive the pixel circuits.

Figure 8:
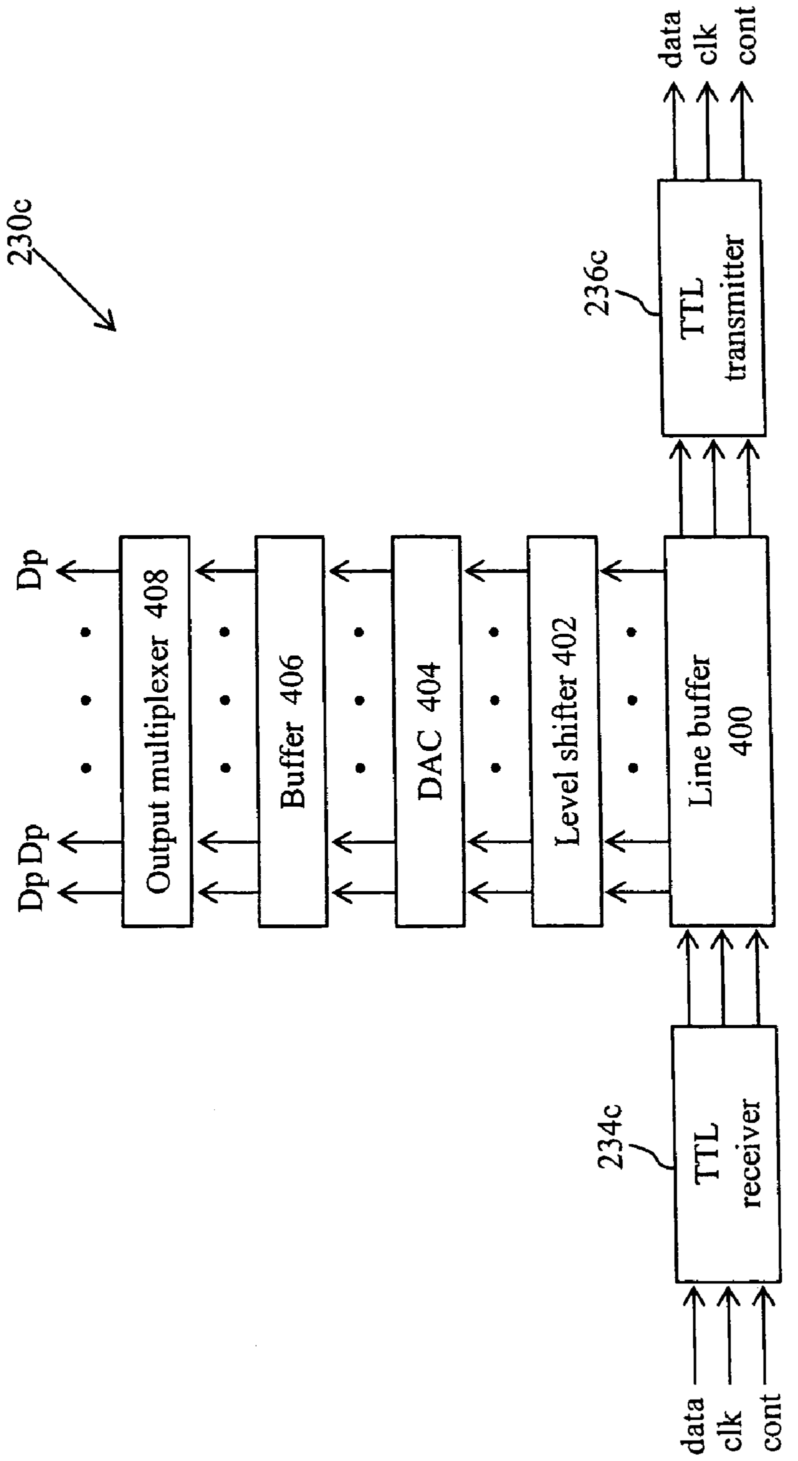
FIG. 8 is a block diagram of a data driver.

In FIG. 8, the data driver 230*c* includes a TTL receiver 234*c*, a TTL transmitter 236*c*, a line buffer 400, a level shifter 402, a digital-to-analog converter (DAC) 404, a buffer 406, and an output multiplexer 408. The line buffer 400 is coupled to the TTL receiver 234*c* and the TTL transmitter 236*c*. The line buffer 400 can either store the pixel data received from the TTL receiver 234*c* or forward the received pixel data and clock and control signals to the next data driver (not shown in the figure) through the TTL transmitter 236*c*.

The line buffer 400 sends the stored pixel data to a level shifter 402 for a level shifting operation according to the clock signal and the control signal. The pixel data are converted to analog signals by the DAC 404, temporarily stored in the buffer 406, and output as pixel data Dp through the output multiplexer 408. The buffer 406 has a higher driving power and can drive the data line for transmitting the pixel data Dp.

The structure of the data driver 230*a* is similar to the structure of the data driver 230*c* except that the data driver 230*a* has two TTL transmitters 236*a*.

Figure 9:
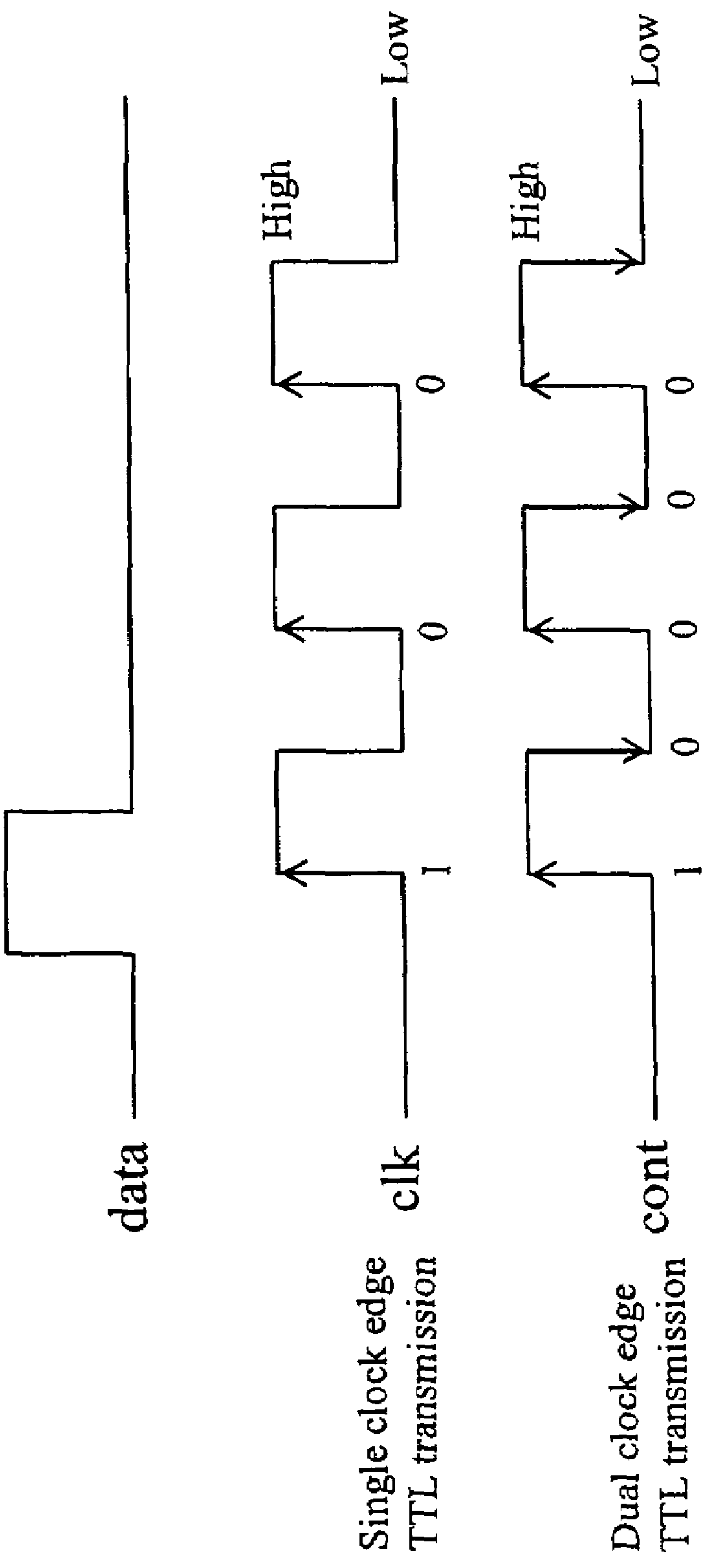
FIG. 9 are timing diagrams.

Referring to FIG. 9, the reception and transmission of TTL signals can be triggered by a single clock edge so that data is latched at each, e.g., rising edge of a clock cycle. The reception and transmission of the TTL signals can also be triggered by dual clock edges so that data is latch at both the rising edge and the falling edge of a clock cycle. Using both the rising and falling clock edges to trigger reception and transmission of data will double the data rate as compared to using just the rising edge. Thus, when the clock frequency remains the same, when both the rising and falling clock edges are used to trigger reception and transmission of data, the number of transmission lines disposed on the glass substrate 210 can be reduced. The area outside of the active display area on the glass substrates that needs to be allocated for the transmission lines can be reduced so that the display 200 can have a thinner outer frame.

Figure 10:
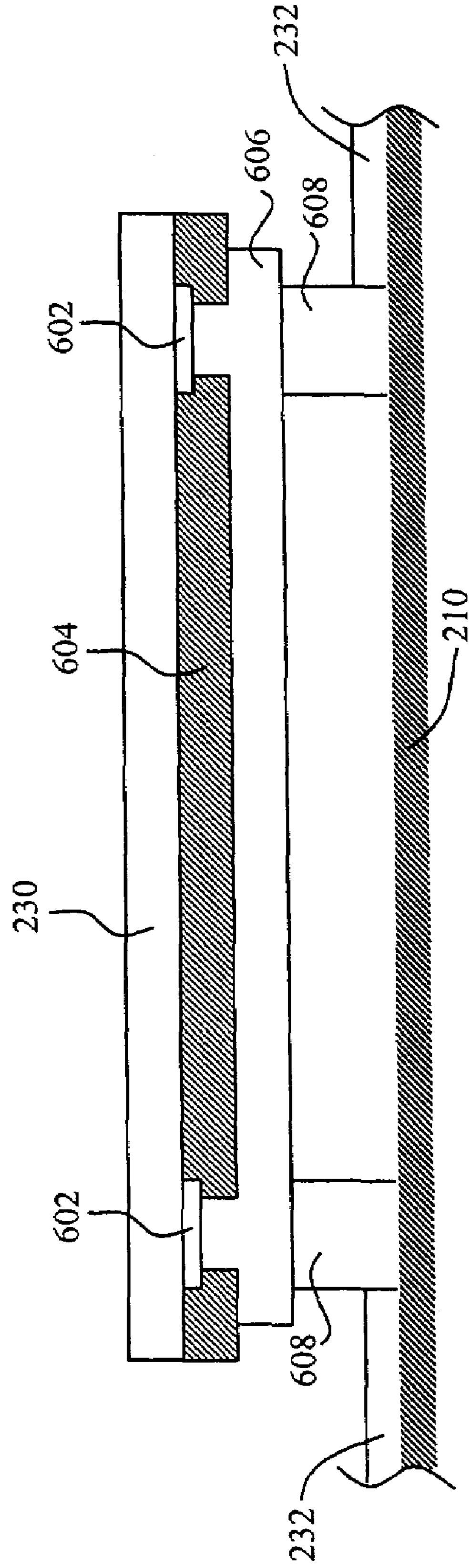
FIG. 10 is a cross-sectional diagram of a data driver and transmission lines disposed on a substrate.

FIG. 10 is a cross-sectional diagram of the data driver 230 and transmission lines 232 that are disposed on the glass substrate 210 through a post-passivation process. Aluminum pads 602, disposed under the data driver 230, are connected to signal lines of the data driver 230. The aluminum pads 602 are insulated from each other by a passivation layer 604. A gold conduction layer 606 is disposed under the aluminum pads 602 and the passivation layer 604 for connecting the aluminum pads 602 to gold contact bumps 608. The gold contact bumps 608 are coupled to transmission lines that are connected to adjacent data drivers. By using the structure described above, when one data driver sends pixel data to another data driver, the signal-line impedance on which the pixel data are transmitted can be reduced.

The examples of flat panel displays described above having a number of advantages, including the following.

1. When TTL signals are used to transmit the clock, data, and control signals between the data drivers, the TTL signals can have a larger amplitude and are less susceptible to interference by noise, as compared to other signal transmission methods, such as use of mini-CVDS or whisper-bus signals. The TTL signals can also have a better performance in terms of power stability.

2. The data drivers that transmit and receive TTL signals can have a simpler structure and consume less power than data drivers that communicate using, e.g., whisper-bus signals.

3. When dual clock edge TTL signaling is used (FIG. 9), either the clock frequency can be reduced (which decreases noise), or the number of signal lines between the data drivers can be reduced, as compared to previous methods that use single clock edge signaling. Thus, the width of the display frame can be reduced, resulting in a thin bezel display.

4. In a wire-on-array transmission structure (i.e., the transmission lines are directly disposed on the glass substrate), the impedance of the transmission lines can be reduced when the data drivers are disposed on the glass substrate through the post-passivation technique described above.

Figure 11:
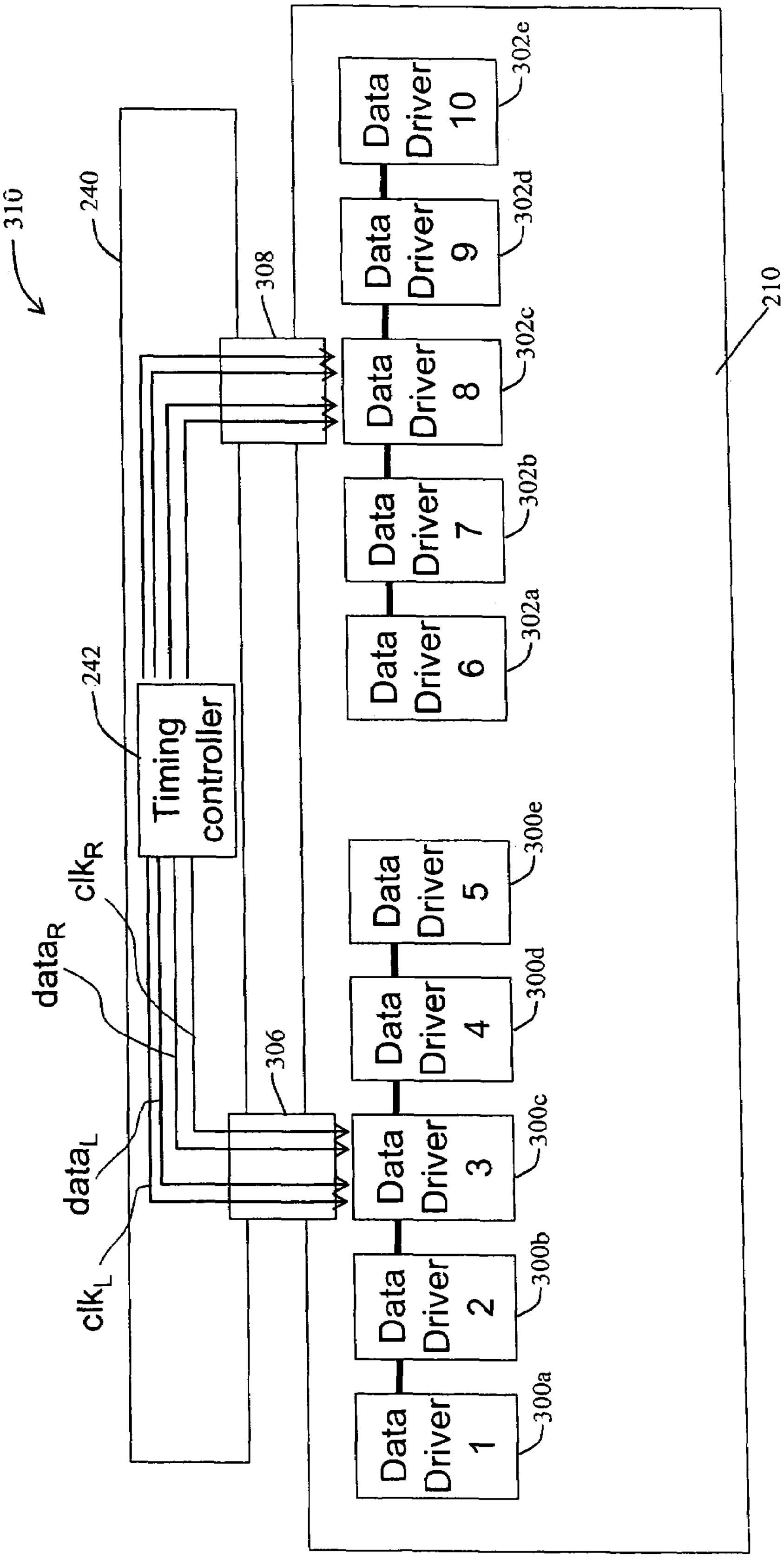
FIG. 11 is a schematic diagram of a display.

FIG. 11 is a schematic diagram of an example of a flat panel display 310 having a timing controller 242 and ten data drivers 300*a*-300*e* and 302*a*-302*e*. The timing controller 242 sends data, control, and clock signals to the data driver 300*c* through a flexible printed circuit 306. The data driver 300*c* sends data, control, and clock signals to the data drivers 300*a*, 300*b*, 300*d*, and 300*e* through transmission lines disposed on the glass substrate 210 (using wire-on-array structure). The timing controller 242 sends data, control, and clock signals to the data driver 302*c* through a flexible printed circuit 308. The data driver 302*c* sends data, control, and clock signals to the data drivers 302*a*, 302*b*, 302*d*, and 302*e* through transmission lines disposed on the glass substrate 210 (using wire-on-array structure).

In this example, the display 310 is a 17-inch SXGA display having a resolution of 1280*1024 and a 60 Hz frame refresh rate. According to VESA standard, when taking blanking lines into account, the SXGA display has a resolution of 1688*1066. The display 310 uses a clock signal having a frequency 60*688*1066/2=54 MHz for sending pixel data from the timing controller 242 to the third data driver 300*c* and the eighth data driver 302*c*. The third data driver 300*c* transmits pixel data to the second and fourth data drivers 300*b*, 300*d* according to a clock signal having a frequency 54/2=27 MHz. Similarly, the eighth data driver 302*c* transmits pixel data to the seventh and ninth data drivers 302*b*, 302*d* according to a clock signal having a frequency 54/2=27 MHz.

Assuming that each data driver has 384 channels, the number of data drivers needed to drive 1280*3 pixels is 1280*3/384=10 data drivers. The time required for transmitting each row of pixel data to the data drivers is 6*384*2.5/18+2=322 clock cycles.

There are two configurations of the display 310 for the timing controller 242 and the data drivers 300*c* and 302*c*. In the first configuration, referred to as display 310*a* and shown in FIGS. 12 and 13, the timing controller 242 sends pixel data D1 to D5 to the data driver 300*c* (or 302*c*) at a first clock frequency, and the data driver 300*c* (or 302*c*) forwards the pixel data D1, D2, D4, and D5 to the data drivers 300*b* and 300*d* (or 302*b* and 302*d*) at a second clock frequency lower than the first clock frequency. In the second configuration, referred to as display 310*b* and shown in FIGS. 14 and 15, the timing controller 242 sends pixel data D1 to D5 to the data driver 300*c* (or 302*c*) through 36 signal lines, and the data driver 300*c* (or 302*c*) forwards the pixel data D1, D2, D4 and D5 to the data drivers 300*b* and 300*d* (or 302*b* and 302*d*) through 18 signal lines.

Figure 12:
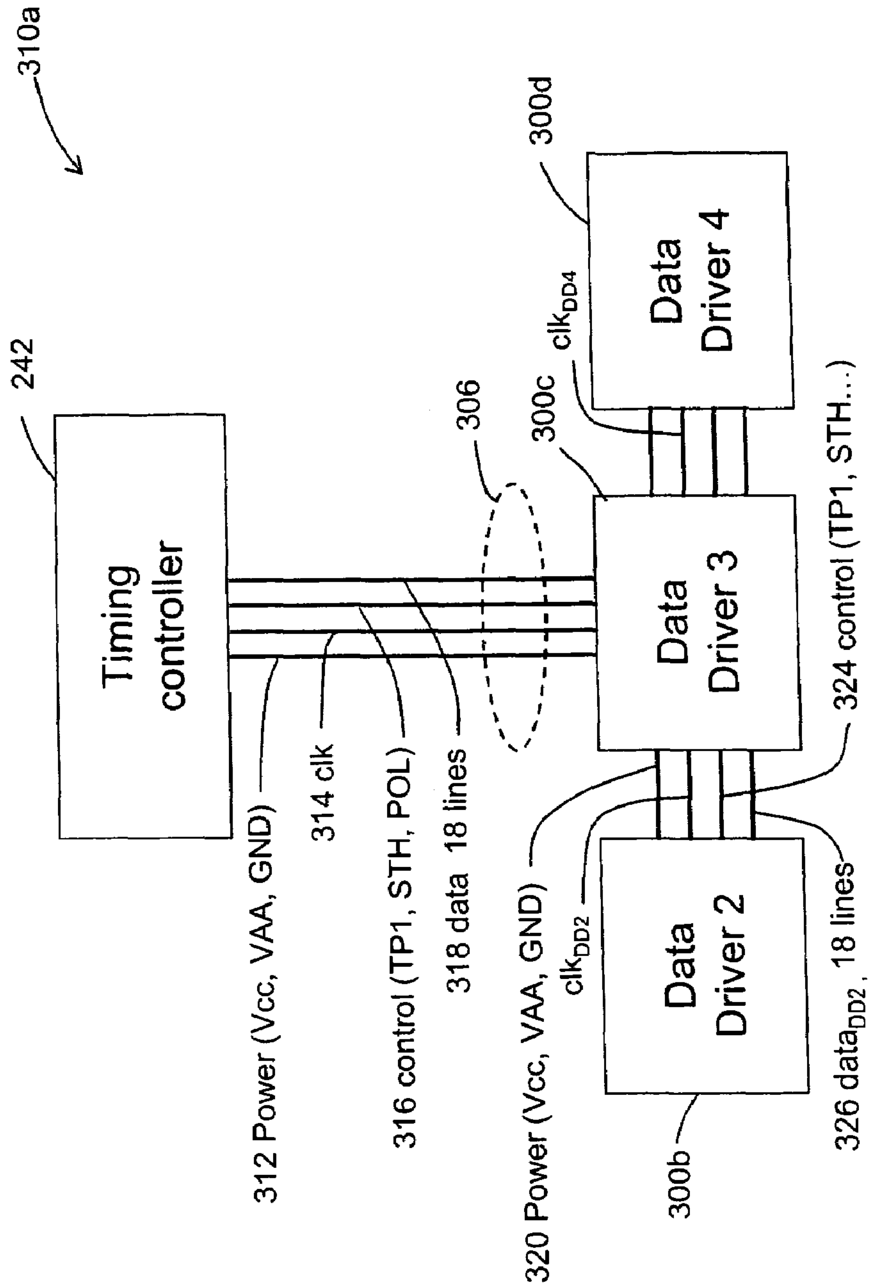
FIG. 12 shows a timing controller and data drivers.

Referring to FIG. 12, the display 310*a* has a flexible printed circuit 306 that includes power signal lines 312 (for carrying, e.g., Vcc, Vaa, and ground voltage signals), clock signal line 314 (for carrying, e.g., clock signals $clk_{DD1}$ to $clk_{DD5}$), control signal lines 316 (for carrying, e.g., TP1, STH, POL control signals), and 18 data lines for sending pixel data used by the data drivers 300*a*-300*c*.

The voltage signal Vcc is about 3.3 V and serves as a logic high level reference voltage to the data drivers and scan drivers. Scan drivers are used to drive scan lines (also referred to as gate lines) of the pixel circuits. The voltage signal Vaa is about 10 V and serves at an analog high level reference voltage for the thin film transistors on the glass substrate. The ground voltage signal provides a logic ground reference for the data drivers and scan drivers.

The control signal STH indicates the start of transmission of a row of pixel data. The control signal TP1 triggers the data drivers to use the received pixel data to drive the corresponding pixel circuits. The control signal POL is used to reverse polarity. The reason for reversing polarity is because the data signals for a pixel need to be driven in reverse polarities between adjacent frames, using a Vcom signal as reference, to prevent liquid crystal molecules from sticking at a particular orientation. For example, if the Vcom signal is 4V, and the data signal is 5V, it is called "positive polarity", whereas if data signal is 3V, it is called "negative polarity".

Figure 13:
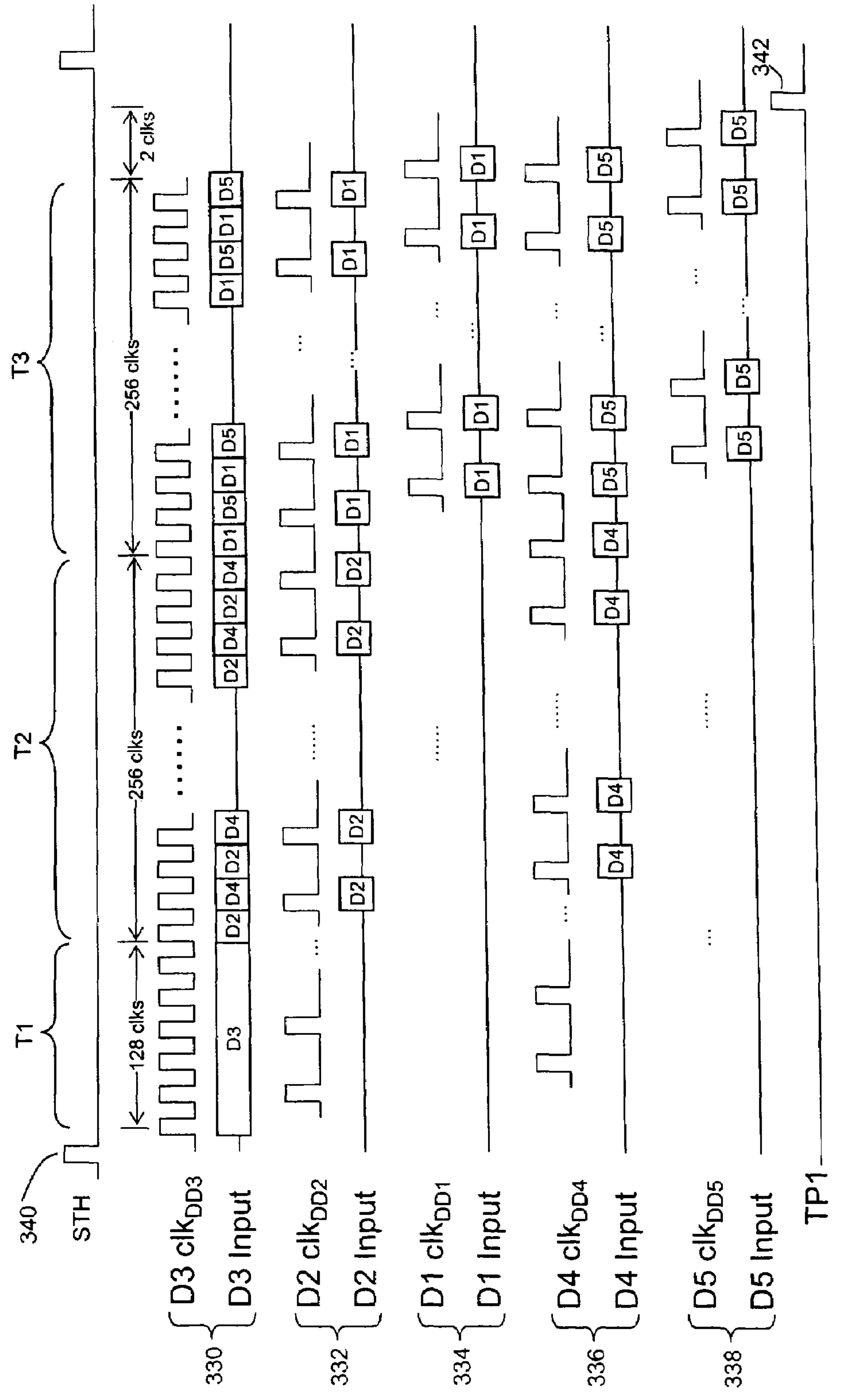
FIG. 13 are timing diagrams.

In FIG. 13, timing diagrams show how pixel data are transmitted to the data drivers 300*a*-300*e*. A pulse 340 on the STH control signal line indicates the start of data transmission. A timing diagram 330 shows that, during T1 (the first 128 clock cycles), pixel data D3 intended for the third data driver 300*c* are sent to the data driver 300*c* through the 18 data signal lines according to the clock signal $clk_{DD3}$. Because there are 384*6 bits of pixel data transmitted through 18 signal lines, 128 clock cycles are used to transmit the pixel data D3 intended for the third data driver 300*c*.

During T2 (the next 256 clock cycles), pixel data D2 and D4 intended for the data drivers 300*b* and 300*d* are sent to the third data driver 300*c* according to the clock signal $clk_{DD3}$. The third data driver 300*c* outputs the pixel data D2 through a left output to the second data driver 300*b* according to the clock signal $clk_{DD2}$, which is half the frequency of the clock signal $clk_{DD3}$. The third data driver 300*c* outputs the pixel data D4 through a right output to the fourth data driver 300*d* according to the clock signal $clk_{DD4}$, which is also half the frequency of the clock signal $clk_{DD3}$.

There is a delay of one clock cycle between the time that the third data driver 300*c* receives the pixel data D2 and D4, and the time that the second and fourth data drivers 300*b* and 300*d* receive the pixel data D2 and D4, respectively. There is a delay of two clock cycles between the time that the third data driver 300*c* receives the pixel data D1 and D5, and the time that the first and fifth data drivers 300*a* and 300*e* receive the pixel data D1 and D5, respectively.

During T3 (the next 256 clock cycles), pixel data D1 and D5 intended for the data drivers 300*a* and 300*e* are sent to the third data driver 300*c* according to the clock signal $clk_{DD3}$. The third data driver 300*c* sends the pixel data D1 to the second data driver 300*b* according to the clock signal $clk_{DD1}$, which forwards the pixel data D1 to the first data driver also according to the clock signal $clk_{DD1}$. The third data driver 300*c* sends the pixel data D5 to the fourth data driver 300*d* according to the fifth clock signal $clk_{DD5}$, which forwards the pixel data D5 to the fifth data driver 300*e* also according to the fifth clock signal $clk_{DD5}$. The clock signals $clk_{DD4}$ and $clk_{DD5}$ each has a frequency that is half the frequency of the clock signal $clk_{DD3}$.

A pulse 342 on the TP1 control signal line triggers the data drivers D1 to D5 to use the received pixel data to drive the corresponding pixel circuits.

The timing controller 242 transmits pixel data D6, D7, D8, D9, and D10 to the data drivers 302*a*, 302*b*, 302*c*, 302*d*, and 302*e* in a manner similar to the way that the timing controller 242 transmits the pixel data D1-D5 to data drivers 300*a*-300*e*.

Figure 14:
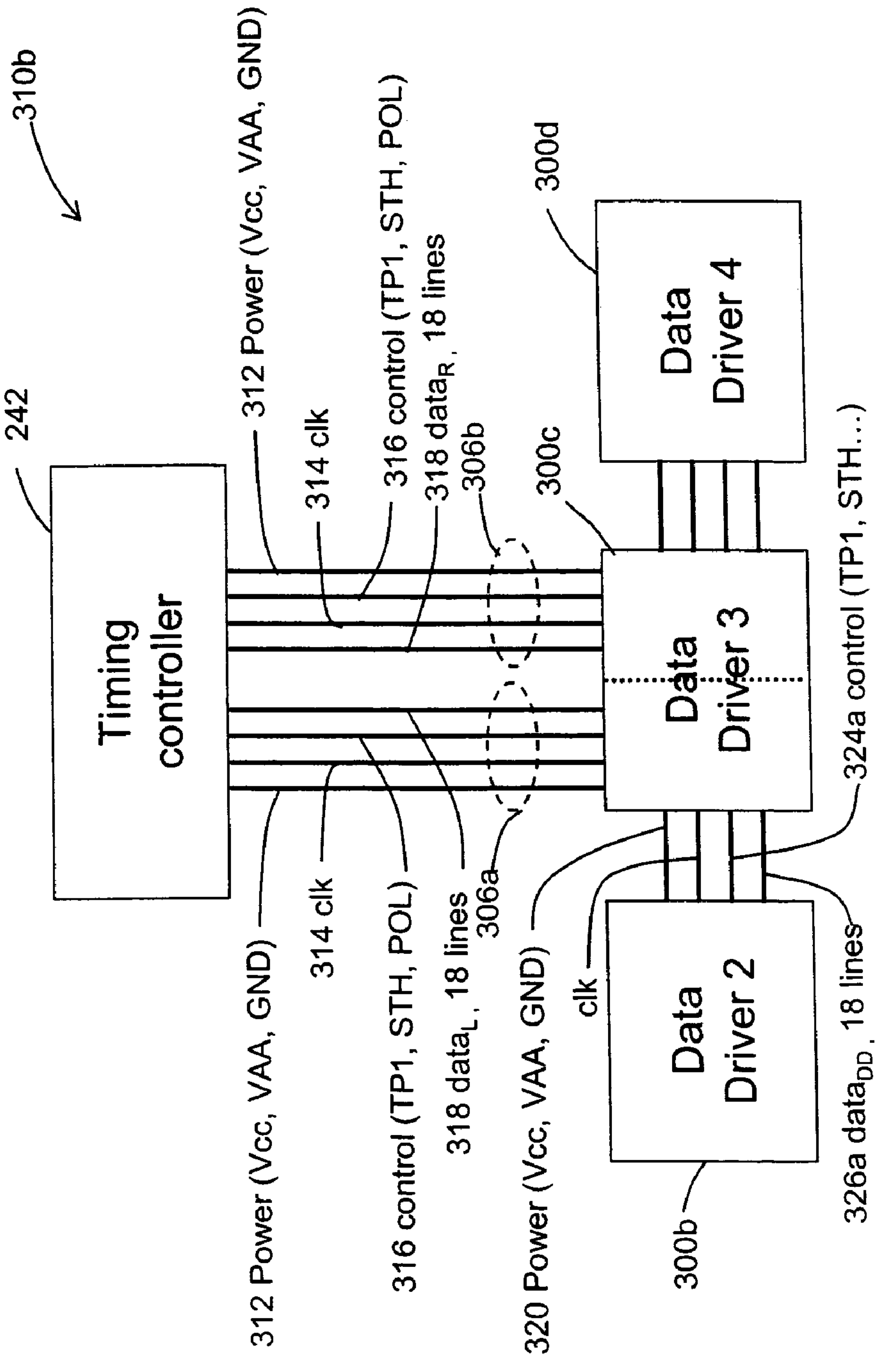
FIG. 14 shows a timing controller and data drivers.

Referring to FIG. 14, the display 310*b* has a flexible printed circuit 306 that includes two sets of signal lines 306*a* and 306*b*, each including power signal lines 312, clock signal line 314, control signal lines 316, and data lines 318. The first set of signal lines 306*a* is used to transmit pixel data D1, D2, and half of D3 to a left input of the data driver 300*c*, in which the pixel data D1 and D2 are forwarded to the data drivers 300*a* and 300*b*. The second set of signal lines 306*b* is used to transmit pixel data D4, D5, and the other half of D3 to a right input of the data driver 300*c*, in which the pixel data D4 and D5 are forwarded to the data drivers 300*d* and 300*e*.

The signals transmitted through the power signal lines 312 and the control signal lines 316 of the first set of signal lines 306*a* are similar to those in FIG. 12. The display 310*b* uses a clock signal that is different from the display 310*a* (FIG. 12). In the display 310*b*, the timing controller 242 sends the pixel data D1 to D5 to the third data driver 300*c* according to a clock signal clk. The same clock signal clk is used to synchronize transmission of the pixel data between the data drivers.

Figure 15:
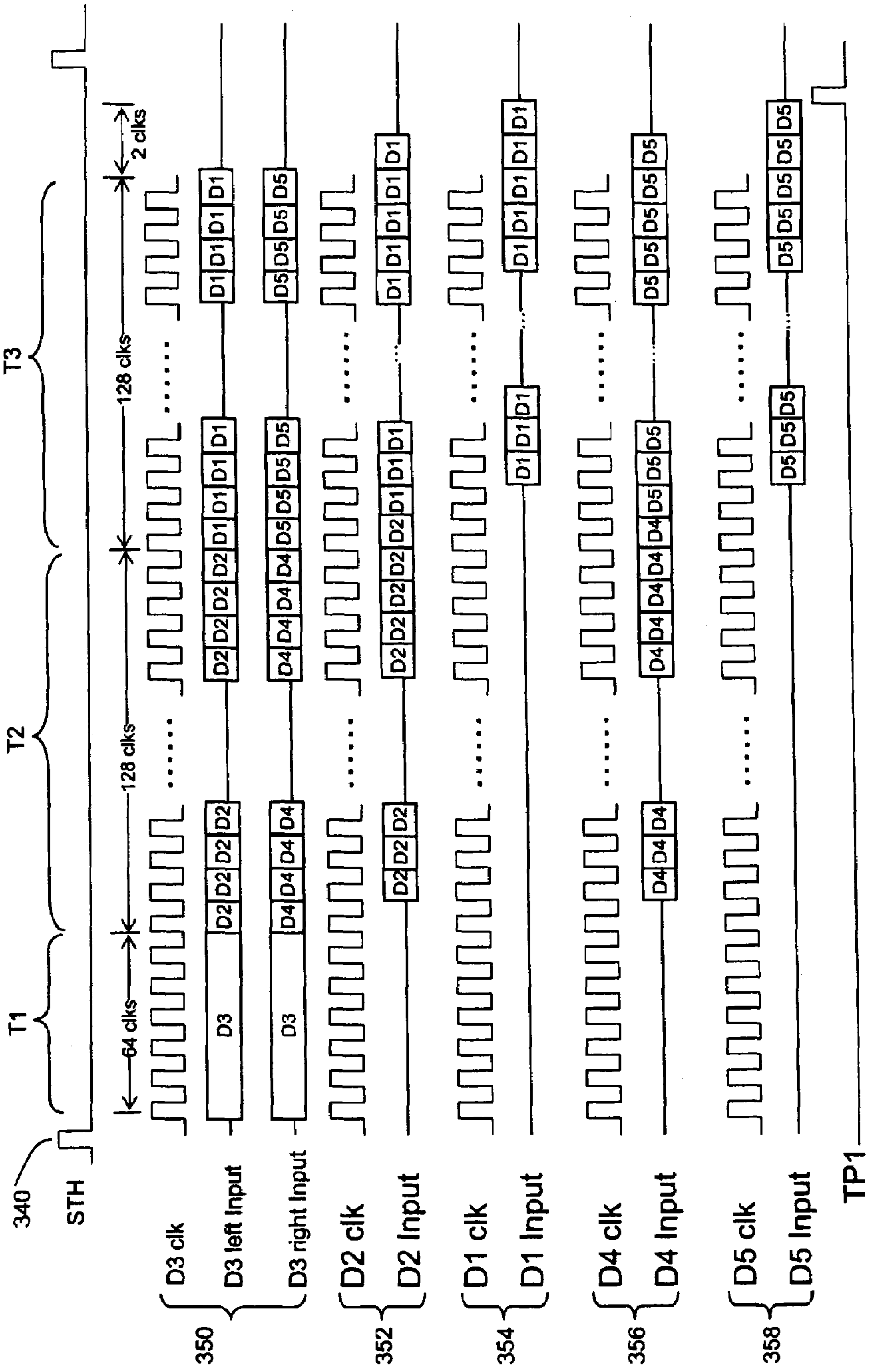
FIG. 15 are timing diagrams.

FIG. 15 are timing diagrams showing how pixel data are transmitted to the data drivers 300*a*-300*e* in the display 310*b*. A pulse 340 on the STH control signal line indicates the start of data transmission. A timing diagram 350 shows that, during T1 (the first 64 clock cycles), pixel data D3 intended for the third data driver 300*c* are sent to the left and right inputs of the data driver 300*c* through the 36 data signal lines according to the clock signal clk. Because there are 384*6 bits of pixel data transmitted through 36 signal lines, 64 clock cycles are used to transmit the pixel data D3 intended for the third data driver 300*c*.

During T2 (the next 128 clock cycles), pixel data D2 and D4 intended for the data drivers 300*b* and 300*d* are sent to the third data driver 300*c* according to the clock signal clk. The third data driver 300*c* outputs the pixel data D2 and D4 through a left and right output to the second and fourth data drivers 300*b* and 300*d*, respectively, according to the clock signal clk.

During T3 (the next 128 clock cycles), pixel data D1 and D5 intended for the data drivers 300*a* and 300*e* are sent to the third data driver 300*c* according to the clock signal clk. The third data driver 300*c* sends the pixel data D1 to the second data driver 300*b* according to the clock signal clk, which forwards the pixel data D1 to the first data driver also according to the clock signal clk. The third data driver 300*c* sends the pixel data D5 to the fourth data driver 300*d* according to the clock signal clk, which forwards the pixel data D5 to the fifth data driver 300*e* also according to the clock signal clk.

A pulse 342 on the TP1 control signal line triggers the data drivers D1 to D5 to use the received pixel data to drive the corresponding pixel circuits.

The timing controller 242 transmits pixel data D6, D7, D8, D9, and D10 to the data drivers 302*a*, 302*b*, 302*c*, 302*d*, and 302*e* in a manner similar to the way that the timing controller 242 transmits the pixel data D1-D5 to data drivers 300*a*-300*e*.

There is a delay of one clock cycle between the time that the third data driver 300*c* receives the pixel data D2 and D4, and the time that the second and fourth data drivers 300*b* and 300*d* receive the pixel data D2 and D4, respectively. There is a delay of two clock cycles between the time that the third data driver 300*c* receives the pixel data D1 and D5, and the time that the first and fifth data drivers 300*a* and 300*e* receive the pixel data D1 and D5, respectively.

Figure 16:
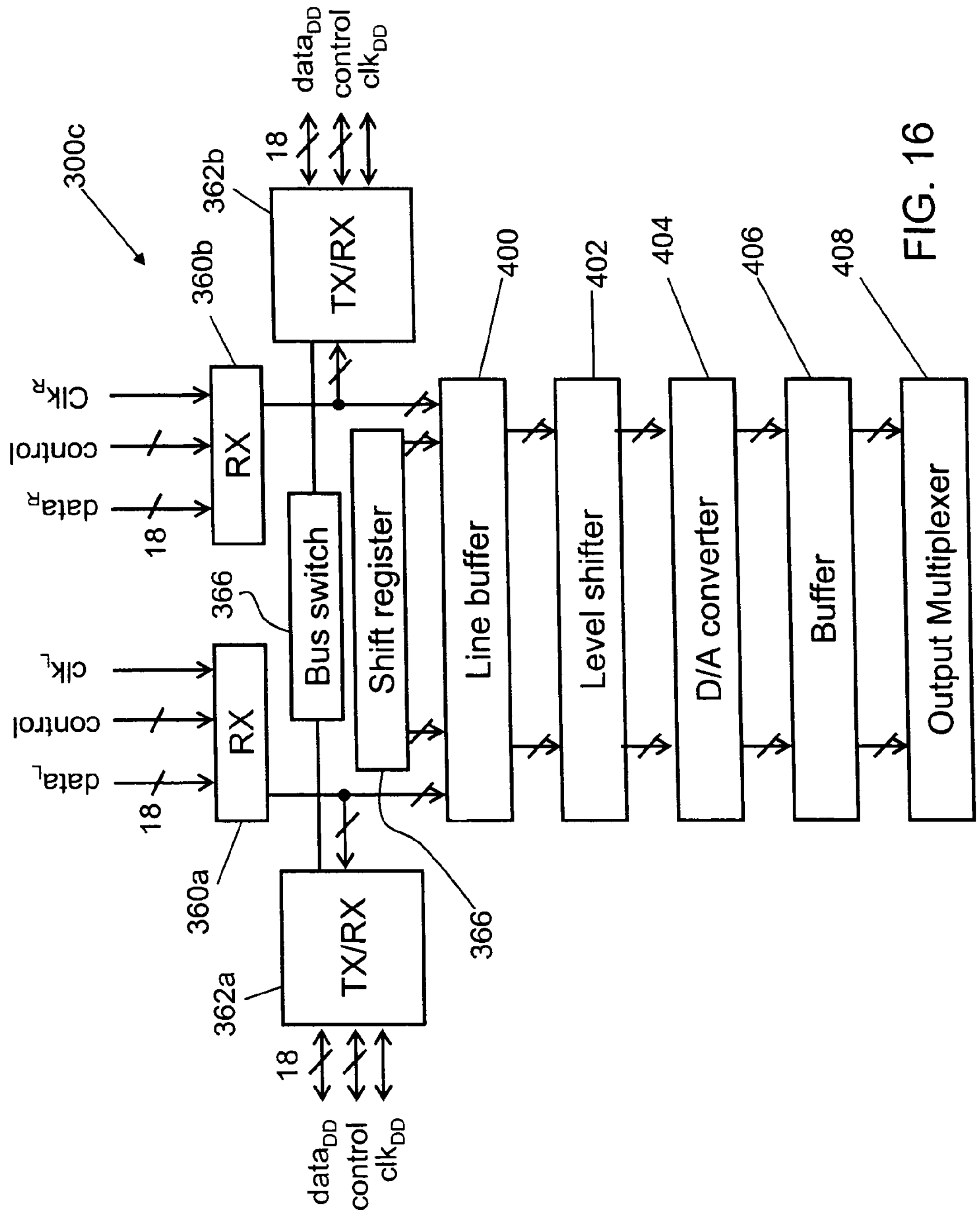
FIG. 16 shows a block diagram of a data driver.

FIG. 16 shows a block diagram of the data driver 300*b* of the display 310*b* (FIG. 14). The data driver 300*c* includes a left TTL receiver 360*a* and a left TTL receiver 360*b* for receiving data, control, and clock signals from the timing controller 242. Transceivers 362*a* and 362*b* are used to communicate with neighboring data drivers 300*b* and 300*d*, respectively. The data driver 300*c* includes a line buffer 400, a level shifter 402, a digital-to-analog converter (DAC) 404, a buffer 406, and an output multiplexer 408, which operate in a similar manner to corresponding components in FIG. 8.

A bus switch 364 is used for directing the pixel data received from the timing controller 242 to either the nearby data drivers (300*b* and 300*d*) or to the line buffer 400. The pixel data are sent as serial bits from the timing controller 242 to the data driver 300*c*. When the bus switch 364 directs the pixel data to the line buffer 400, a shift register 366 receives the serial pixel data from timing controller and outputs the pixel data to the line buffer 400. The line buffer 400 outputs the one line of pixel data to the level shifter 402 in parallel.

Although some examples have been discussed above, other implementations and applications are also within the scope of the following claims. For example, the flat panel display can be an organic light emitting diode (OLED) display, a plasma display, or a field emission display, that has a thin outer frame. The signals transmitted between data drivers do not have to be TTL signals. Differential signaling (such as low voltage differential signaling (LVDS) can also be used. Several parameters, such as the number of pixels in the display, the number of data drivers, the number of channels driven by each data driver, the clock frequency, can all be modified.

Figure 17:
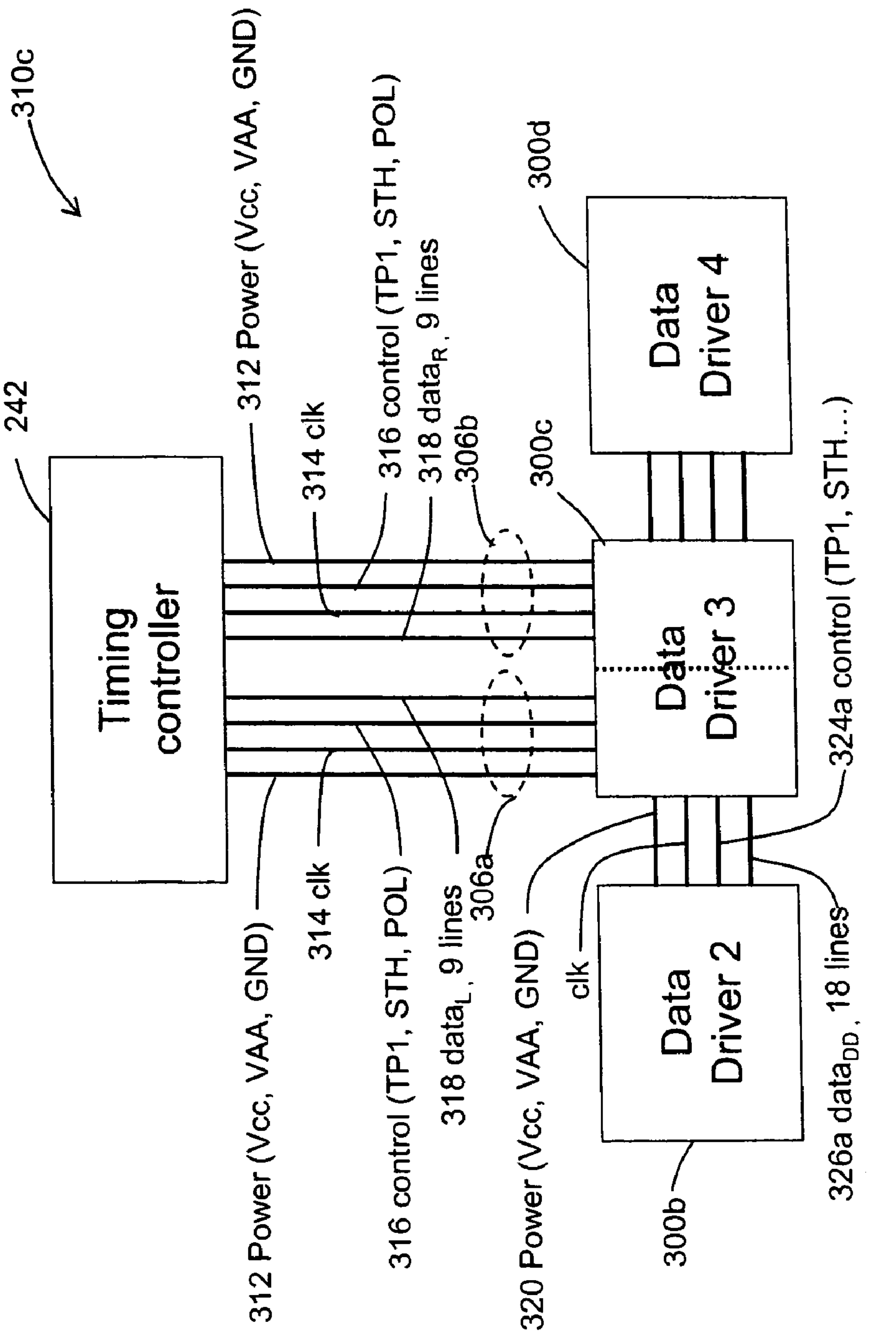
FIG. 17 shows a timing controller and data drivers.

Referring to FIG. 17, in a third configuration of the display 310, referred to as display 310*c*, the flexible printed circuit 306 includes two sets of signal lines 306*a* and 306*b*, each including power signal lines 312, clock signal line 314, control signal lines 316, and data lines 318. Each set of signal lines 306*a* and 306*b* includes 9 signal lines. The first set of signal lines 306*a* is used to transmit pixel data D1, D2, and half of D3 to a left input of the data driver 300*c*, in which the pixel data D1 and D2 are forwarded to the data drivers 300*a* and 300*b*, respectively. The second set of signal lines 306*b* is used to transmit pixel data D4, D5, and the other half of D3 to a right input of the data driver 300*c*, in which the pixel data D4 and D5 are forwarded to the data drivers 300*d* and 300*e*, respectively.

The signals transmitted through the power signal lines 312 and the control signal lines 316 of the first set of signal lines 306*a* are similar to those in FIG. 14. The display 310*b* uses a clock signal that is different from the display 310*a* (FIG. 14). In the display 310*c*, the timing controller 242 sends the pixel data D1 to D5 to the third data driver 300*c* according to a clock signal clk. The reception and transmission of the TTL signals from the timing controller 242 to the third data driver 300*c* is triggered by dual clock edges so that data is latched at both the rising edge and the falling edge of a clock cycle. On the other hand, the reception and transmission of the TTL signals from one data driver to another data driver is triggered by a single edge of a clock signal. In this example, 18 signal lines are used to transfer pixel data from one data driver to another data driver, while 9 signal lines are used to transfer pixel data from the timing controller 242 to the third data driver 300*c*.

Advantages of using dual clock edges for the transmission of pixel data from the timing controller 242 to the data driver include the following. The cost of the third data driver 300*c* and the timing controller 242 can be reduced because fewer pins can be used (as compared to FIG. 14). The cost of the flexible printed circuit can be reduced because there are fewer signal lines (as compared to FIG. 14).

What is claimed is:

1. A display, comprising:

an array of pixel circuits;

a first data driver to receive pixel data from a timing controller and use the pixel data to drive a first portion of the pixel circuits, wherein the first data driver also receives additional pixel data from the timing controller, the additional pixel data not used by the first data driver in driving pixel circuits; and a second data driver to receive the additional pixel data from the first data driver and use the additional pixel data to drive a second portion of the pixel circuits;

wherein the first data driver receives the pixel data for use in driving the first portion of the pixel circuits from the timing controller through a first number of signal lines, and the first data driver receives the additional pixel data intended for the second data driver from the timing controller through a second number of signal lines, the first number being different from the second number.

2. The display of claim 1 wherein the first data driver receives the additional pixel data from the timing controller according to a first clock frequency, and the first data driver sends the additional pixel data to the second data driver according to a second clock frequency that is different from the first clock frequency.

3. The display of claim 2 in which the first data driver sends different portions of the pixel data to the second data driver and a third data driver alternately during alternate clock cycles.

4. The display of claim 2 in which the second clock frequency is lower than the first clock frequency.

5. The display of claim 1, further comprising transmission lines disposed on a glass substrate to transmit pixel data from the first data driver to the second data driver.

6. The display of claim 1 in which the second data driver comprises a first transistor-transistor-logic (TTL) interface and a second TTL interface, the first TTL interface to receive portions of the pixel data from the first data driver, the second TTL interface to forward portions of the pixel data to a third data driver.

7. The display of claim 2, further comprising the timing controller to output a first clock signal having pulses, a second clock signal having pulses that correspond to odd number pulses of the first clock signal, and a third clock signal having pulses that correspond to even number pulses of the first clock signal.

8. The display of claim 7 in which the first data driver sends some of the pixel data to the second data driver according to the second clock signal, and sends some of the pixel data to the third data driver according to the third clock signal.

9. The display of claim 1 wherein the first data driver sends the additional pixel data to the second data driver through signal lines attached to a glass substrate of the display.

10. The display of claim 1 in which the first data driver comprises a transistor-transistor-logic (TTL) interface to send the additional pixel data to the second data driver.

11. The display of claim 1 in which the first data driver comprises a differential signaling interface to send the additional pixel data to the second data driver.

12. A display, comprising:

an array of pixel circuits;

data drivers to drive the pixel circuits, the data drivers comprising a first data driver to receive pixel data through a first number of signal lines and to forward some of the pixel data to a second data driver through a second number of signal lines, the second number being different from the first number, the second data driver using received pixel data to drive corresponding pixel circuits.

13. The display of claim 12 in which the first data driver sends different portions of the pixel data to the second data driver and a third data driver simultaneously.

14. The display of claim 12 in which the second number is less than the first number.

15. The display of claim 12 in which the second number of signal lines are disposed on a glass substrate.

16. The display of claim 12 in which the first data driver comprises a transistor-transistor-logic (TTL) interface to send the pixel data to the second data driver, and the second data driver comprises a TTL interface to receive the pixel data.

17. A display, comprising:

a substrate;

an array of pixel circuits disposed on the substrate;

a timing controller to output pixel data, a first clock signal, a second clock signal, and a third clock signal, each of the second and third clock signals having a frequency that is less than the frequency of the first clock signal;

a first data driver to drive corresponding pixel circuits;

a second data driver to drive corresponding pixel circuits;

a third data driver to drive corresponding pixel circuits, in which during a first time period, the first data driver receives pixel data from the timing controller according to the first clock signal and stores the pixel data in a buffer, and during a second time period, the first data driver receives pixel data from the timing controller according to the first clock signal, sends some of the pixel data to the second data driver according to the second clock signal, and sends some of the pixel data to the third data driver according to the third clock signal, each of the second and third data drivers storing the received pixel data in a buffer; and a fourth data driver and a fifth data driver, in which during a third time period, the second data driver and the third data driver receive pixel data from the first data driver and forward the received pixel data to fourth and fifth data drivers, respectively, each of the fourth and fifth data drivers storing the received pixel data in a buffer.

18. The display of claim 17 in which during a fifth time period, the first, second, third, fourth, and fifth data drivers drive corresponding pixel circuits based on pixel data stored in respective buffers.

19. A method of operating a display, comprising:

transmitting pixel data from a timing controller to a first data driver through a first number of signal lines; and transmitting the pixel data from the first data driver to a second data driver through a second number of signal lines, the first number being different from the second number.

20. The method of claim 19, comprising:

transmitting the pixel data from the timing controller to the first data driver at a first clock frequency; and transmitting the pixel data from the first data driver to the second data driver at a second clock frequency, the second clock frequency being different from the first clock frequency.

21. The method of claim 20, further comprising driving pixel circuits using the second data driver based on the pixel data received at the second data driver.

22. The method of claim 19, further comprising driving pixel circuits using the second data driver based on the pixel data received at the second data driver.

23. The method of claim 19, in which transmitting pixel data from the timing controller to the first data driver comprises transmitting first pixel data from the timing controller to the first data driver;

transmitting second pixel data from the timing controller to the first data driver; and transmitting third pixel data from the timing controller to the first data driver.

24. The method of claim 23, comprises comprising transmitting the second pixel data from the first data driver to the second data driver through signal lines attached to a glass substrate.

25. The method of claim 23 wherein the first pixel data has information about chroma values for a first portion of a row of pixel circuits, and the second pixel data has information about chroma values for a second portion of the row of pixel circuits.

* * * * *